United States Patent [19]

Aubry et al.

[11] Patent Number: 4,488,736
[45] Date of Patent: Dec. 18, 1984

[54] VEHICLE SUSPENSION INCORPORATING OSCILLATING ARMS

[75] Inventors: Jacques A. Aubry, Cabries-F; Michel R. Bonfils, Saint-Cannat, both of France

[73] Assignee: Societe' Nationale Industrielle Aerospatial, France

[21] Appl. No.: 486,794

[22] Filed: Apr. 20, 1983

[30] Foreign Application Priority Data

May 6, 1982 [FR] France .................. 82 07909

[51] Int. Cl.$^3$ .................................. B60G 11/18
[52] U.S. Cl. .................. 280/723; 267/148; 267/154; 280/689
[58] Field of Search ........... 280/701, 690, 700, 706, 280/717, 689, 721, 723; 267/148, 149, 57, 154

[56] References Cited

U.S. PATENT DOCUMENTS

| | | | |
|---|---|---|---|
| 2,426,513 | 8/1947 | Linn | 280/723 |
| 3,856,289 | 12/1974 | Steele | 267/154 |
| 4,168,075 | 9/1979 | Matschinsky | 280/689 |
| 4,291,895 | 9/1981 | Wohrle et al. | 280/723 |

FOREIGN PATENT DOCUMENTS 1359271 12/1964 France .
2011327 7/1979 United Kingdom .

*Primary Examiner*—Richard A. Bertsch
*Attorney, Agent, or Firm*—Marshall, O'Toole, Gerstein, Murray & Bicknell

[57] ABSTRACT

The present invention relates to a suspension for a train of two wheels of a vehicle, comprising two arms oscillating about an axis transverse with respect to said vehicle and each bearing one of said wheels, elastic means and damper means being associated with said arms respectively to dampen the vertical movements of said wheels, wherein the transverse shaft for oscillation of said arms is itself mounted to oscillate parallel to the longitudinal direction of the vehicle. The invention is more particularly applicable to improving passenger comfort in the vehicle and for improving the road-holding qualities of said vehicle.

5 Claims, 6 Drawing Figures

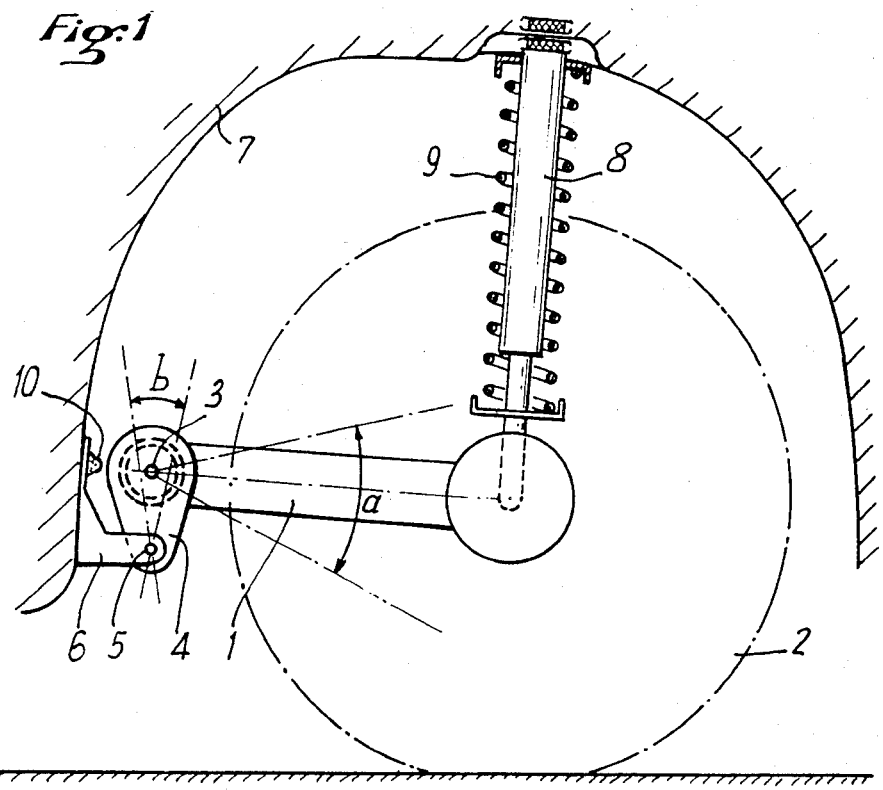
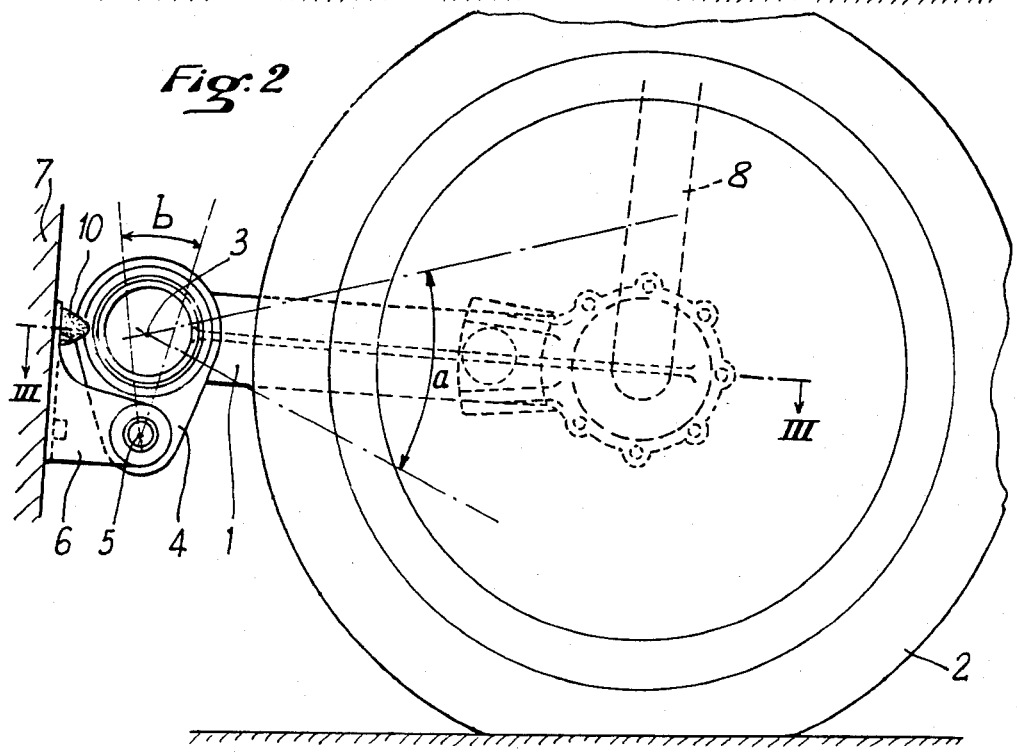

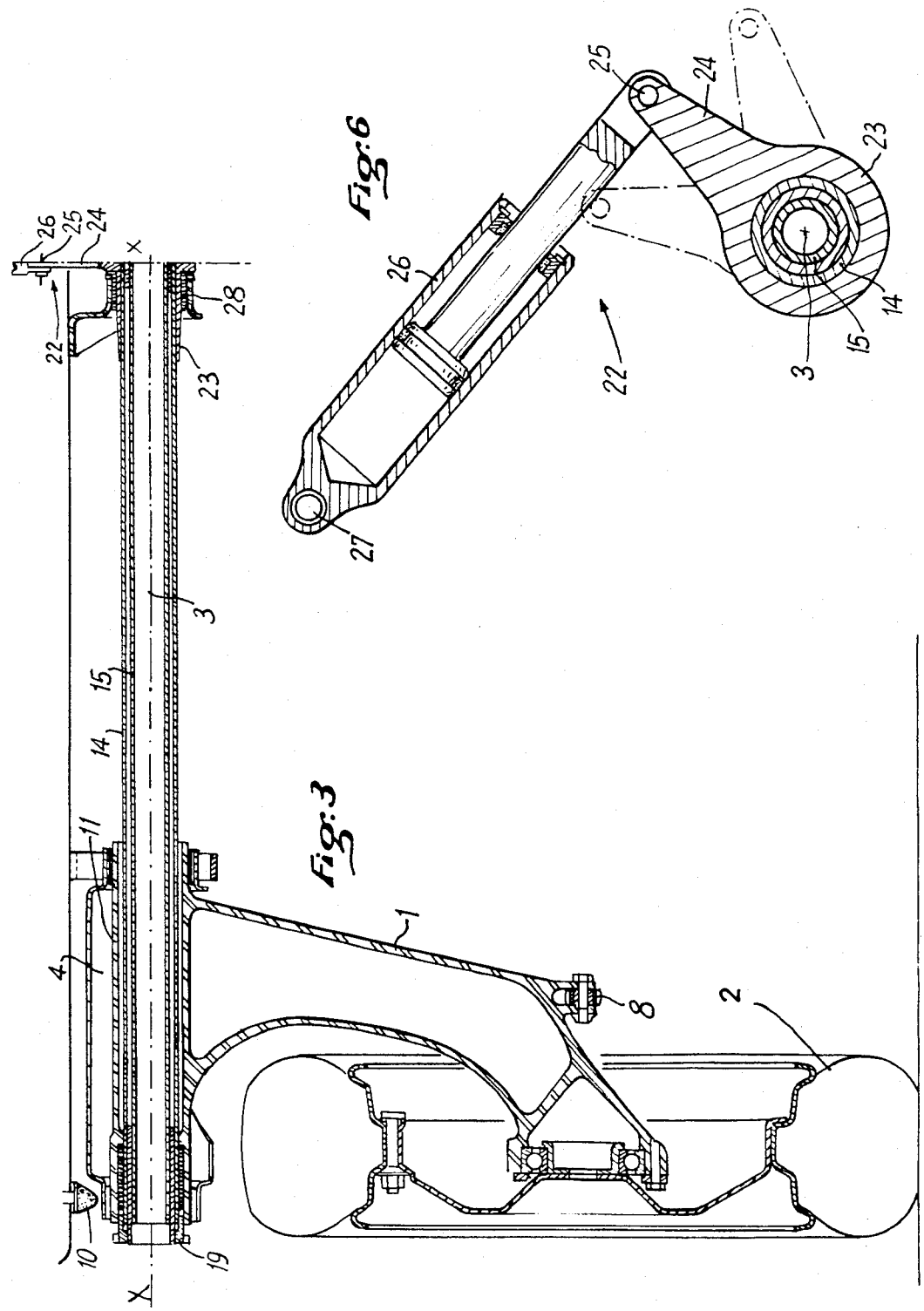

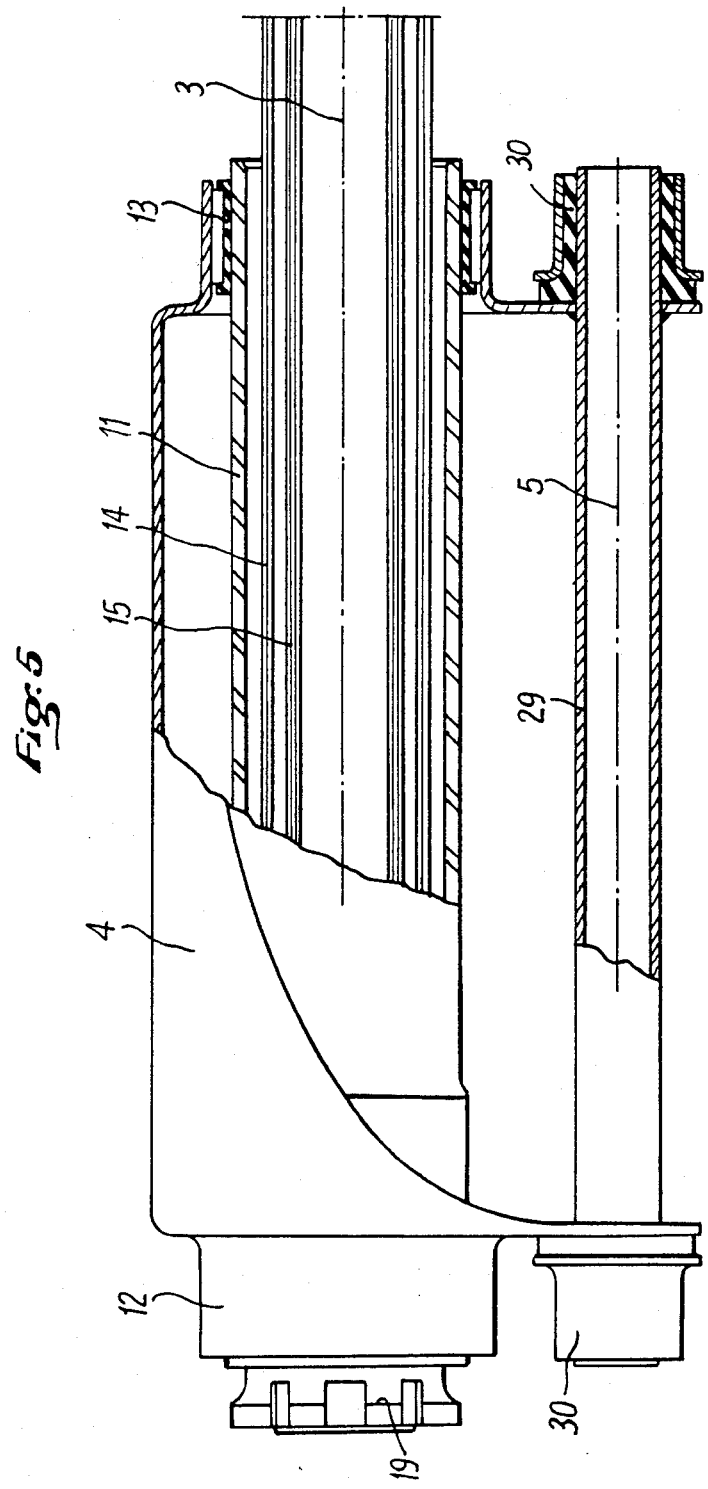

VEHICLE SUSPENSION INCORPORATING OSCILLATING ARMS

The present invention relates to a suspension for a set of two wheels of a vehicle, comprising two arms oscillating about a shaft transverse with respect to said vehicle and each bearing one of said wheels, elastic means such as springs and damper means being associated with said arms respectively to counteract and dampen the vertical movements of said wheels. The suspension according to the invention is more particularly, although not exclusively, adapted to be used as rear suspension of an automobile vehicle of the front wheel drive type.

In known suspensions of this type, the oscillating arms are directly articulated on the chassis of the vehicle, so that said transverse shaft about which they oscillate is fixed with respect to the vehicle. This results in the wheels presenting only a vertical spring movement. Now, for reasons of passenger comfort and of road holding qualities of the vehicle, it is important that the wheels present a certain longitudinal spring movement.

It is an object of the present invention to improve these known suspensions to enable them to offer the wheels such a possibility of longitudinal spring movement.

To this end, according to the invention, the suspension for a set of two wheels of a vehicle, comprising two arms oscillating about a shaft transverse with respect to said vehicle and each bearing one of said wheels, elastic means and damper means being associated with said arms respectively to dampen the vertical movements of said wheels, is noteworthy in that said transverse shaft about which said arms oscillate is itself mounted to oscillate to allow it slight displacements substantially parallel to the longitudinal direction of the vehicle.

Due to such an assembly, the wheels may thus present a certain longitudinal spring movement.

The transverse shaft about which said arms oscillate is advantageously mounted to oscillate about a fixed transverse axis of the vehicle. To this end, each oscillating arm may be articulated on a stirrup piece, itself articulated on the chassis of the vehicle. When the vehicle is at rest, the transverse shaft about which the arms oscillate and the fixed transverse axis of the vehicle preferably define a plane which is at least substantially vertical.

Each arm may be suspended from the chassis of the vehicle via dampers and springs of any known type, associated in any known manner.

However, in an advantageous embodiment, the elastic means for suspension of the oscillating arms comprise an assembly of concentric tubes made of composite synthetic resin-fibre material, coaxial with respect to said transverse shaft about which the arms oscillate and rigidly connected at each of their ends on the one hand with one another and, on the other hand, with one of said arms, said arms are articulated on a stirrup piece concentric to said tubes, the stirrup pieces are articulated to the chassis of the vehicle in eccentric manner with respect to said assembly of tubes and the outer tube of said tube assembly is connected to the chassis of the vehicle at at least one point adjacent the centre of its lengths so as to allow the oscillations of the tube assembly about the articulation of the stirrup pieces on the chassis.

Each half of the outer tube of said tube assembly thus acts as torsion bar for the arm to which it is connected, while the inner tube of said assembly acts as stabilizer coupling means between said arms. The fact of making said tubes of composite synthetic resin-fibre material procures therefor mechanical characteristics corresponding to the functions that they perform and which would be impossible to obtain with steel tubes, of comparable dimensions and weight. Due to this embodiment, a suspension may thus be obtained which, while being simple, is light, so that it makes it possible to obtain a saving in total weight of the vehicle, and therefore a saving in fuel consumption.

Each oscillating arm is preferably disposed towards the rear of the vehicle with respect to the axes of oscillation of the arm and the stirrup piece, so that the corresponding wheel is drawn when the vehicle advances.

In an advantageous embodiment, each arm comprises a hollow transverse sleeve of which the outer wall pivots with respect to the corresponding stirrup piece via two bearings spaced along said transverse shaft about which the arms oscillate and which is traversed by one of the ends of said tube assembly, said end being connected to the inner wall of said sleeve.

The ends of the tube assembly and the inner wall of the sleeve may be connected by friction. To this end, a radially expanding ring may be mounted between the end of said tube assembly and the inner wall of said sleeve and means for axially compressing said ring may be provided on said sleeve.

Furthermore, it is advantageous if each stirrup comprises two bearings spaced along the fixed transverse shaft of the vehicle and traversed by a shaft connected to the chassis of the vehicle.

The bearings of the transverse sleeve of the arms and the bearings of the stirrup pieces are preferably of the elastomer bearing type.

The connection between the chassis and the central part of the tube assembly is advantageously effected via a lever connected to the outer tube and of which the end is connected to the chassis of the vehicle by a connecting rod whose length may be adjusted, for example by a screw and nut device.

Moreover, in order to be able to adjust the stability of the moving vehicle, the connecting rod for eccentrically fixing the outer tube on the chassis is provided to be replaced by a member adjustable in length while the vehicle is moving, for example by a hydraulic jack, so as to allow the angular orientation of said tube assembly about its own axis to be adjusted.

The invention will be more readily understood on reading the following description with reference to the accompanying drawings, in which:

FIG. 1 is a schematic view in elevation of a first embodiment of a suspension according to the invention.

FIG. 2 is a schematic view, likewise in elevation, of a second embodiment of a suspension according to the invention.

FIG. 3 shows, in plan view with respect to FIG. 2, the left-hand half of a suspension according to the invention, with section along line III—III of FIG. 2, the right-hand half of the suspension being identical and symmetrical to the left-hand half.

FIG. 5 is a view, with partial section along line V—V of FIG. 4, of the suspension system of one of the two oscillation shafts according to the invention.

FIG. 6 illustrates the device for anchoring the tube assembly and for correcting stability of the vehicle.

In these Figures, identical references denote like elements.

Figure 4:
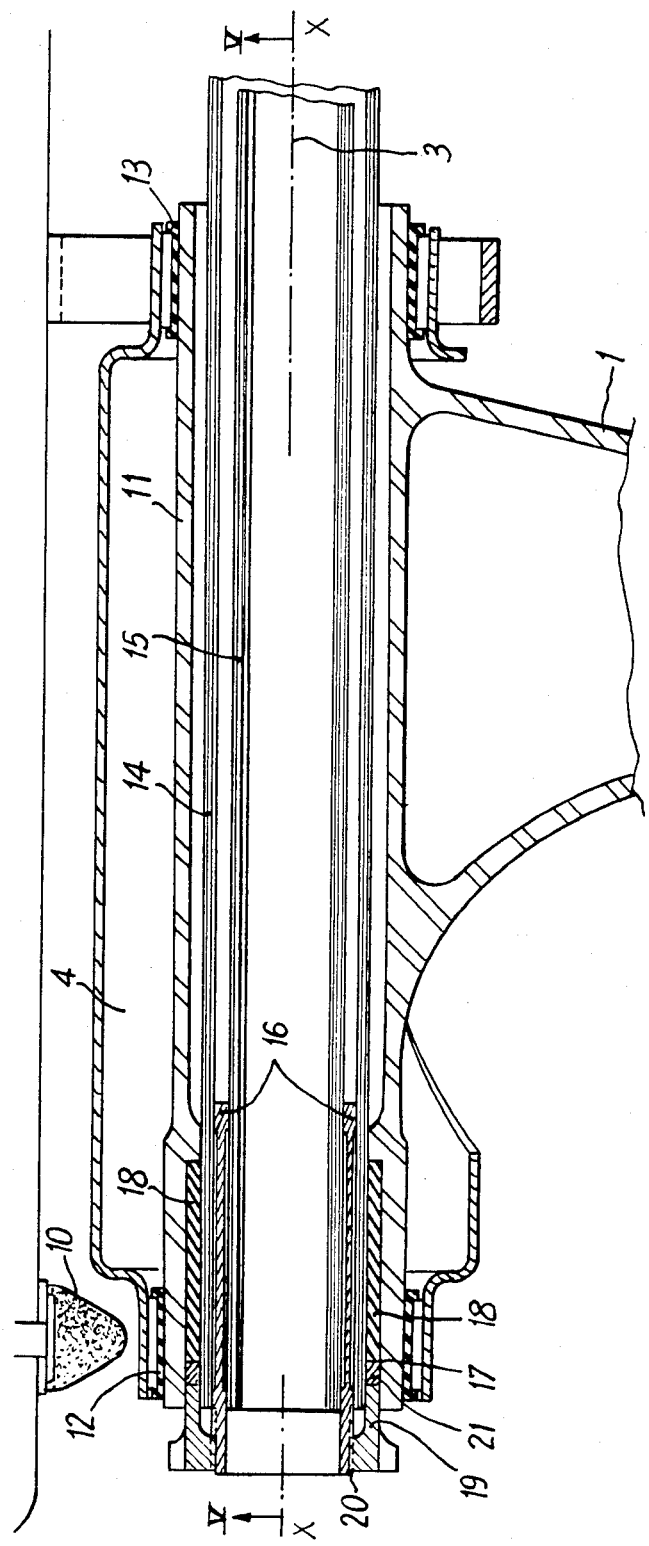
FIG. 4 shows, on a larger scale, the assembly of the suspension arms on the chassis of the automobile vehicle, according to the embodiment of FIG. 3 of the present invention.

Referring now to the drawings, the rear suspension for front wheel drive vehicle, shown in FIG. 1, is of the type with drawn wheel and comprises suspension arms 1. One end of each arm 1 bears a wheel 2 at its end, whilst the other end of said arms is articulated at 3 on a stirrup piece 4 itself articulated at 5, on a fastening lug 6 connected with the chassis 7 of the vehicle (not shown). Moreover, each arm 1 is connected to the chassis 7 via the arrangement of a telescopic damper 8 and a helical spring 9, which are coaxial.

The wheel 2 is thus noted to be capable of a vertical spring movement a about axis 3 and of a longitudinal spring movement b about axis 5. Stops 10, for example made of rubber, are provided in order to avoid accidental knocking of the stirrup pieces 4 against the chassis 7. Axes 3 and 5, which are parallel to each other, since they are both transverse with respect to the vehicle, define a plane which, when the vehicle is at rest, is at least substantially vertical.

In the variant embodiment illustrated in FIGS. 2 to 4, the helical springs 9 have been eliminated and replaced by the elastic return and stabilizer coupling system described in applicants' U.S. Ser. No. 456,535 filed Jan. 7, 1983.

As shown in FIGS. 3 and 4, each arm 1 comprises an elongated sleeve 11 of axis X—X transverse to said arm and merged with axis 3.

At the two ends of the sleeve 11 are arranged bearings 12 and 13, respectively, connecting said arms 1 to the corresponding stirrup piece 4. The bearings 12 and 13, whose axis merges with axis X—X are preferably of the laminated type and therefore allow the arms 1 to rotate about said axis X—X.

The two arms 1 of the suspension of a set of two wheels 2 are connected to each other by an assembly of two tubes 14 and 15, concentric with respect to each other and centred on axis X—X. The two tubes 14 and 15 are made of a composite material constituted by fibres (glass, carbon, boron, etc . . . or a mixture of these materials) coated with a synthetic resin, by carrying out any known process (filamentary winding, superposition of braids, weaving, etc . . . ) making it possible to obtain for said tubes high values of the ratio R/E, in which R is the stress at break and E the modulus of elasticity.

The tubes 14 and 15 are connected to each other at their two ends, for example by gluing with the interposition of an intermediate rigid bush 16.

The connected ends of tubes 14 and 15, thus reinforced by ring 16, pass through the sleeves 11 of the two coupled arms 1 and are housed in a housing 17 in said sleeves provided on the outer bearing 12 side and are connected to the corresponding arm 1 by friction. To this end, in each housing 17 there is provided an elastic bush 18, for example made of an elastomer such as polyurethane, surrounding the outer end of the tube 14, while a compression nut 19 is provided, adapted to screw in a thread 20 in the ring 16. In this way, by screwing the nut 19, the bush 18 may be compressed, possibly via a sliding ring 21, so that said bush 18 expands radially. The static pressure thus created between the bush 18 and the inner wall of the housing 17, between the bush 18 and the tube 14, between the tube 14 and the bush 16 and, finally, between the bush 16 and the tube 15, connects the assembly of tubes 14 and 15 of the two suspension arms 1 by friction.

Moreover, the outer tube 14 is anchored at its centre to the chassis 7, for example via a stability correcting device 22. This device 22 may comprise a bush 23 glued on the outer wall of the tube 14 and connected to a strap 24 articulated at 25 on a hydraulic jack 26, itself articulated at 27 on the chassis 7. The bush 23 pivots in a bearing 28 connected with the chassis 7.

The outer tube 14 thus forms a torsion tube connecting the two suspension arms 1 and variably fixed at its centre to chassis 7. Due to this median anchorage, each half of the torsion tube 14 included between the device 22 and one end acts as a torsion bar independent of the other. Of course, any torsion of one of said halves of the tube 14 is transmitted to the corresponding end of the inner tube 15 which transfers it to its other end. This inner tube 15 therefore acts as stabilizer coupling device for the two arms 1 of the suspension.

It will be readily understood that, by controlling the position of the piston of the hydraulic jack 26 (due to means not shown), therefore the distance between axes 25 and 27, the bush 23 may be rotated about axis X—X and therefore communicate a rotation about said axis to the assembly of tubes 14-15 enabling the angular orientation of the arms 1 about axis X—X and therefore the stability of the vehicle to be adjusted.

Furthermore, the stirrup pieces 4 are articulated on the chassis 7 via shafts 29 of axis 5. The shafts 29 pivot with respect to the stirrup pieces 4 due to bearings 30, while they are rigidly connected to the fastening lugs 6, themselves fixed on the chassis 7. In this way, the assembly of tubes 14 and 15 may pivot about shafts 29 to give the longitudinal spring movement b, while the assembly of said tubes 14 and 15 may twist about its axis to give the vertical spring movement a.

What is claimed is:

1. In a suspension for two wheels of a vehicle,
   a pair of arms mounted on said vehicle for rotation about a transverse axis relative to said vehicle, each arm carrying one of said wheels,
   pivot means attached to said vehicle for permitting said transverse axis to oscillate along the longitudinal axis of said vehicle,
   an assembly comprising inner and outer concentric tubes formed of composite fiber-synthetic resin material, said tubes being coaxial with said transverse axis, said tubes being effectively connected at each of their ends to each other and to one of said arms,
   the outer tube of said assembly being connected to said vehicle at at least one point intermediate its ends by means allowing longitudinal oscillation of said assembly.

2. A suspension in accordance with claim 1 wherein said pivot means comprises a stirrup piece associated with each arm, each stirrup piece having a first end articulated to said vehicle and a second end to which an associated arm is articulated.

3. A suspension in accordance with claim 2, wherein each arm comprises a hollow sleeve section substantially coaxial with said transverse axis and having inner and outer walls,
   said sleeve section being mounted for rotation in an associated stirrup piece by a pair of spaced bearings in contact with the outer wall of said sleeve section, each end of said assembly of tubes passing coaxially through one of said sleeve sections and being effectively connected to the inner wall thereof.

4. A suspension in accordance with claim 1, wherein the connection between said vehicle and said tube assembly is effected by connecting means of adjustable length enabling the angular orientation of said arms to be adjusted.

5. A suspension in accordance with claim 4 wherein said connecting means comprises a hydraulic jack which can be actuated to adjust the angular orientation of said arms while said vehicle is moving.

* * * * *